July 7, 1936.    F. M. BENTZ    2,046,315
SAFETY VALVE FOR HYDRAULIC BRAKES
Filed May 1, 1934    2 Sheets-Sheet 1
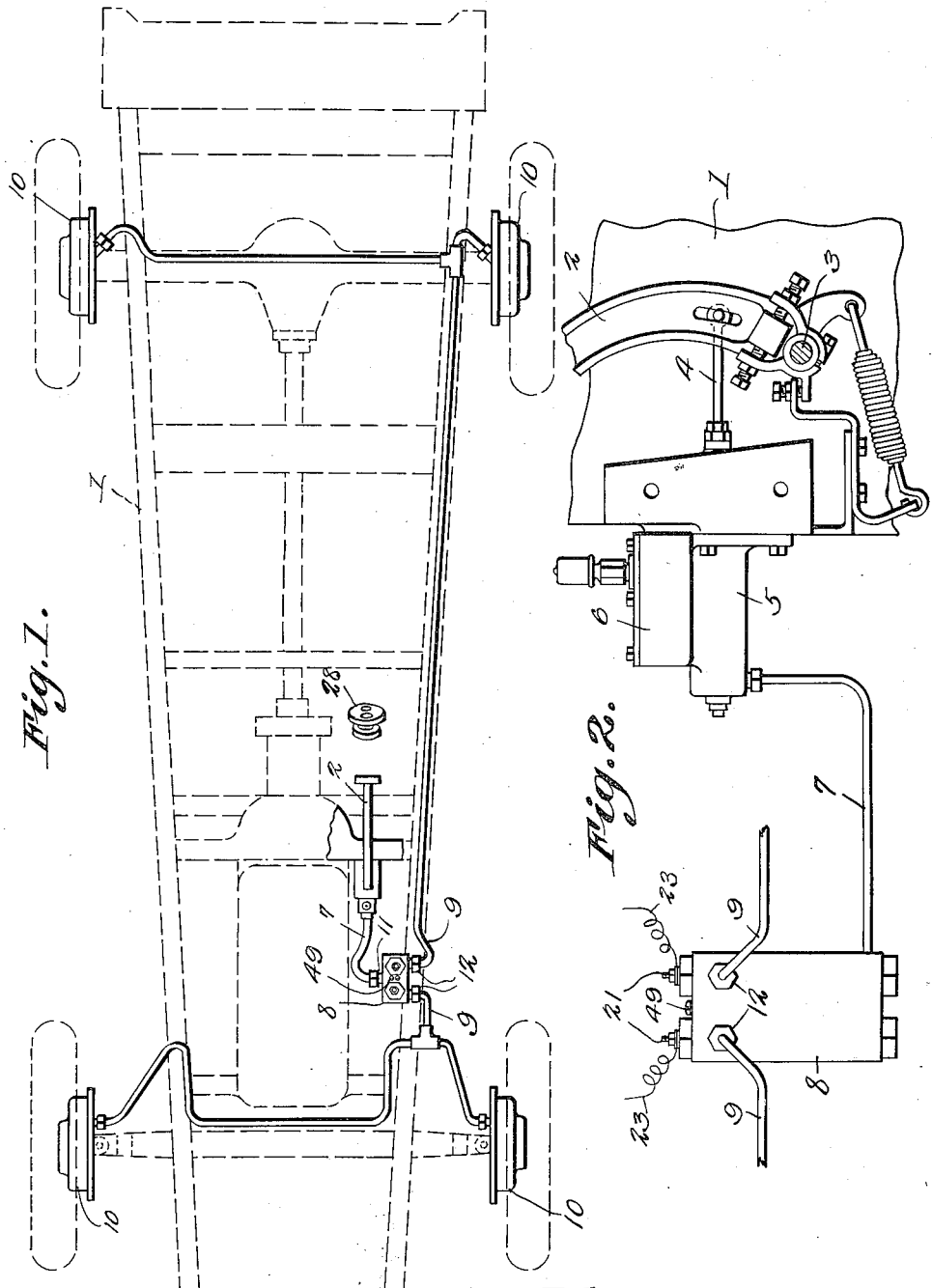
Fred M. Bentz
Inventor
By C.A. Snow &Co.
Attorneys.

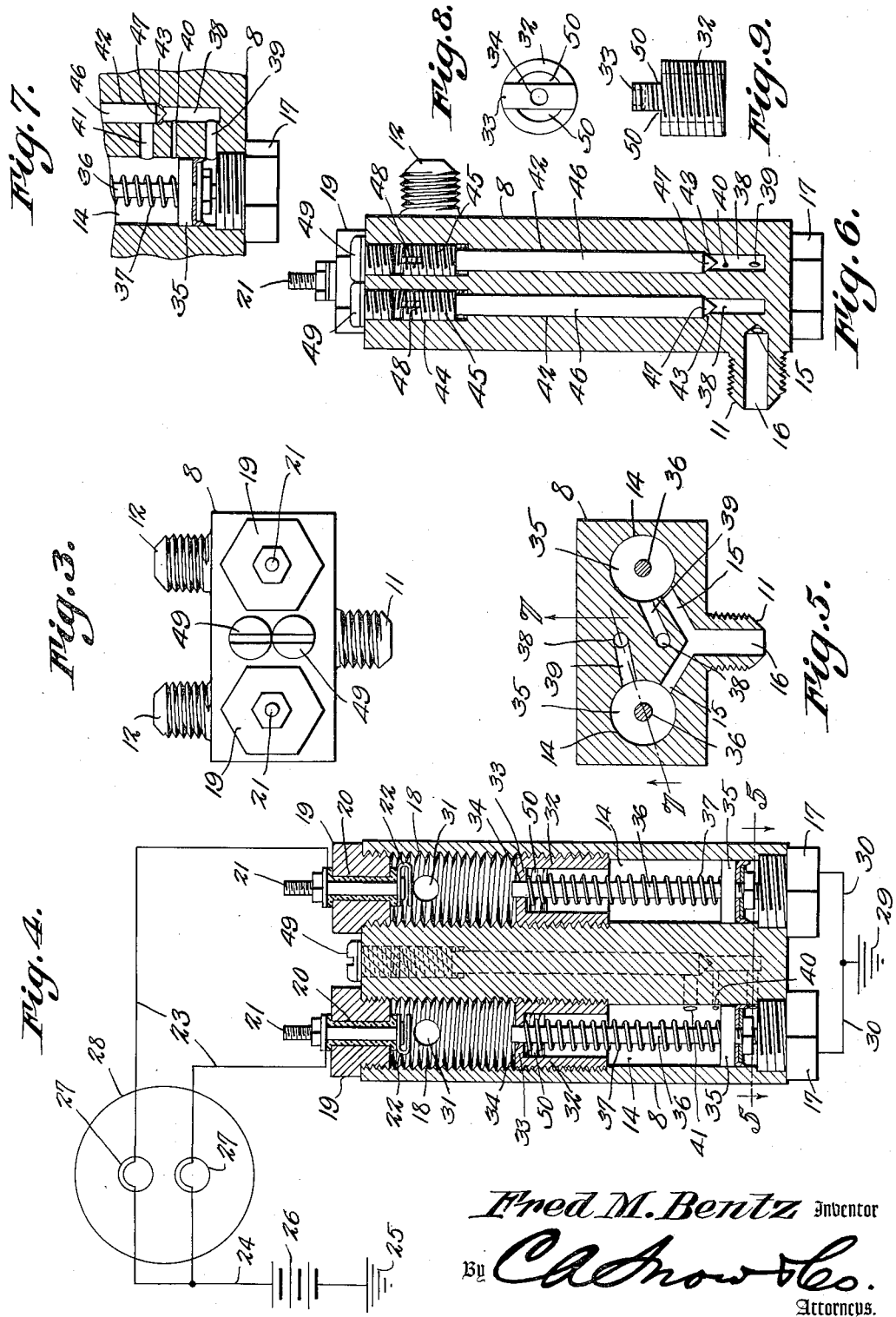

Patented July 7, 1936

2,046,315

UNITED STATES PATENT OFFICE 2,046,315

SAFETY VALVE FOR HYDRAULIC BRAKES

Fred M. Bentz, Temple, Tex.

Application May 1, 1934, Serial No. 723,409

2 Claims. (Cl. 303—84)

This invention aims to provide a simple valve mechanism whereby when one of the brakes of a vehicle becomes excessively leaky, the brake may be cut out, the structure being adapted to be used in connection with hydraulic brakes. The invention aims, further, to provide novel means for bleeding the valve structure, at the will of an operator.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows diagrammatically, and in top plan, a portion of a motor vehicle equipped with the device forming the subject-matter of this application;

Fig. 2 is a side elevation wherein a portion of the motor vehicle is shown in relation to the valve mechanism;

Fig. 3 is a top plan of the valve structure;

Fig. 4 is a vertical transverse section of the valve structure;

Fig. 5 is a transverse section on the line 5—5 of Fig. 4;

Fig. 6 is a section in which the cutting plane is at right angles to the cutting plane in Fig. 4;

Fig. 7 is a section on the line 7—7 of Fig. 5, parts being broken away;

Fig. 8 is a top plan of the guide;

Fig. 9 is an elevation of the guide.

In Fig. 1 and in Fig. 2 there is shown a portion 1 of the frame of an automobile. The brake pedal is indicated at 2 and is movably mounted at 3, in the usual way. The brake pedal 2 is operatively connected at 4 with the master cylinder 5, the fluid reservoir being shown at 6.

A conduit 7 connects the master cylinder 5 with the casing 8 of the device forming the subject-matter of this application. Conduits 9 connect the casing 8 with the hydraulic brakes 10 which are individual to the several wheels of the vehicle.

Describing in detail the structure which characterizes the present invention, the casing 8 is provided on one side and near its lower end with a nipple 11, to which the conduit 7 is connected, and is provided on its opposite side and near its top with nipples 12 to which the conduits 9 are connected. It appears in Fig. 5 that the casing 8 has two parallel cylinders 14, which are connected at their lower ends, by converging passages 15 with the bore 16 of the inlet nipple 11. The cylinders 14 are closed at their lower ends by screw plugs 17. The upper portions of the cylinders 14 are threaded, as shown at 18. Screw plugs 19 are mounted in the threaded extensions 18 of the cylinders 14, and carry insulating bushings 20, wherein binding posts 21 are mounted. U-shaped cushioning springs 22 are secured to the inner ends of the binding posts 21 and are located in the threaded portions 18 of the cylinders 14. To the binding posts 21 are connected conductors 23, having a common connection at 24 to a ground 25. A battery 26, or other source of electrical energy, is interposed in the connection 24. Signals 27, for instance electric lamps, are interposed in the conductors 23 and may be carried by a housing 28, placed on the instrument board (not shown) of the vehicle, or elsewhere. The casing 8 is grounded at 29, through suitable conductors 30. The bores 31 of the outlet nipples 12 open into the threaded extensions 18 of the cylinders 14.

Tubular valve seats 32 are threaded into the parts 18 of the cylinders 14. These seats 32 are provided at their upper ends with upstanding, inverted, U-shaped guides or bridges 33, each having, intermediate its ends, an opening 34 shown in Figs. 8 and 4. Suitably packed piston valves 35 are mounted to reciprocate in the cylinders 14 and have stems 36 which reciprocate in the openings 34 of the guides 33 of the seats 32. Compression springs 37 surround the stems 36 of the piston valves 35, the upper ends of the springs abutting against the tops of the guides 33 on the valve seat members 32, the lower ends of the springs 37 engaging the piston valves 35.

In the lower part of the casing 8 (Figs. 7 and 6) there are parallel longitudinal bores 38 which terminate short of the bottom of the casing 8. Under the impulse of the compression springs 37, the piston valves 35 move downwardly, until the stems 36 of the piston valves rest at their lower ends on the bottom screw plugs 17, which may be considered to be parts of the casing 8. The piston valves 35 and their stems 36 are shown, in Figs. 4 and 7, in the position referred to. The casing 8 has first or outer transverse ports 39, establishing communication between the cylinders 14 and the bores 38. When the piston valves 35 are in the positions shown in Figs. 4 and 7, the first ports 39 are below or lower than the piston valves 35. The casing 8 has second or intermediate transverse ports 40, establishing communication between the bores 38 and the cylinders 14. When the piston valves 35 are in the lowered position of Figs. 4 and 7, the intermediate ports are above the piston valves 35, and, like the first ports 39, are open, as Fig. 7 will show. The second ports 40 are of smaller diameter than the first ports 39, and because the second ports 40 are small, the proper hydrostatic advantage is gained. Third or inner transverse ports 41 in the casing 8 establish communication between the bores 38 and the cylinders 14, although the third ports 41 normally are closed by valve means now to be described.

The bores 38 are enlarged as they extend upwardly, as shown at 42, and it is with these enlarged portions of the bores that the third or inner ports 41 communicate. At the juncture of the parts 38 and 42 of the bores, valve seats 43 exist, as shown in Figs. 6 and 7. The valve seats 43 are located between the third or inner ports 41 and the second or intermediate ports 40. At their upper ends, the bores 38 are still further enlarged, as shown at 44, and are there threaded to receive the heads 45 of valves 46, the lower ends of the valves being tapered at 47, to cooperate with the seats 43. The heads 45 of the valves 46 have screw driver kerfs 48, so that the valves 46 may be moved longitudinally, toward and away from the seats 43, to close or open the inner ports 41. In the normal operation of the device, the valves 46 close the ports 41, as shown in Fig. 7. The heads 45 of the valves 46 are housed beneath closure plugs 49 (Figs. 6 and 3) threaded into the parts 44 of the bores.

In practical operation, during the time that the brakes are not applied, the piston valves 35 are in the lowered position of Fig. 7, the ports 40 being open, and the pressure being equalized on both sides of the piston valves. Under the impulse of the brake pedal 2, the connection 4 and the master cylinder 5 of Fig. 2, the fluid is urged through the conduit 7, into the bore 16 of the nipple 11 in Fig. 5, through the passages 15, and into the cylinders 14, below the piston valves 35. The piston valves 35 are raised, the ports 40 are closed, and as the piston valves are raised, the pressure above and below the piston valves is transmitted through the tubular seats 32 and through the openings 50 (Fig. 8) that exist on each side of the bridge or guides 33 to the conduits 9 and to the brakes 10, the brakes being thus applied.

In the event that one of the brakes 10 becomes inoperative, the pressure in the part 18 (Fig. 4) of the cylinder is reduced, and this reduction takes place also, through the openings 50 of Fig. 8, in the cylinder-proper 14 also. The pressure through the passage 15 of Fig. 5, below the piston valve 35, then overcomes the thrust of the spring 37, and the piston valve 35, together with its stem 36, moves upwardly. The piston valve 35 seats against the lower end of the member 32 in Fig. 4, and there is no discharge of pressure through the defective brake 10, that brake being cut out.

As the valve stem 36 moves upwardly, it engages the cushioning spring 22, and through the binding post 21, closes the circuit through the appropriate signal 27. The driver of the car thus is admonished that one pair of the brakes is defective.

In order to bleed the system quickly and thoroughly, the plug 49 may be removed, and the valve 46 may be raised, by threading it upwardly, the port 41 of Fig. 7 then being placed in wide-open relation with respect to the cylinder 14 and the bore 38.

Referring to Fig. 7, it will be seen that the port 39, the bore 38 and the port 40 form a by-pass leading from the inlet end of the cylinder 14 to the space between the piston 35 and the guide 32, means being provided for checking the movement of the piston toward the inlet end of the cylinder, under the action of the spring 37, in such position that the piston is between the ends 39 and 40 of the by-pass, with both ends of the by-pass open.

Having thus described the invention, what is claimed is:

1. In a device of the class described, a casing, having a cylinder, one end portion of which is smooth, the opposite end portion of which is threaded, the casing having an inlet located adjacent to one end of the cylinder and communicating with the smooth portion of the cylinder, the casing having an outlet located adjacent to the opposite end of the cylinder and communicating with the threaded portion of the cylinder, removable closures for both ends of the cylinder, one of the closures being engaged with the threaded portion of the cylinder, a valve seat and guide located intermediate the ends of the cylinder and having an opening therethrough for the passage of fluid, the valve seat and guide being threaded into the threaded portion of the cylinder, the casing having a bore located approximately parallel to the axis of the cylinder, the casing being provided with transversely spaced outer, intermediate and inner transverse ports communicating at one end with the bore and communicating at the opposite end with the smooth portion of the cylinder, a valve under the control of an operator and movable in the bore, the valve normally closing the inner port, a piston slidable in the cylinder adjacent to the inlet and having a stem slidable in the guide, spring means interposed beteween the guide and the piston for moving the piston in one direction, toward the inlet end of the cylinder, and means for checking the movement of the piston, in said one direction, under the action of the spring means, in such position that the piston is between the outer and intermediate ports, the piston being movable in an opposite direction, into engagement with the guide and valve seat, to close the opening in the guide and valve seat.

2. In a device of the class described, a casing having a cylinder, the casing having an inlet located adjacent to one end of the cylinder, the casing having an outlet located adjacent to the opposite end of the cylinder, removable closures for both ends of the cylinder, a removable valve seat and guide located intermediate the ends of the cylinder and having an opening therethrough for the passage of fluid, the opening communicating at its ends with the respective end portions of the cylinder, means for holding the valve seat fixedly in the cylinder, the casing having a bore located approximately parallel to the axis of the cylinder, the casing being provided with transversely spaced outer, intermedite and inner ports communicating at one end with the bore and communicating at the opposite end with the cylinder, between the guide and the inlet end of the cylinder, a valve under the control of an operator, and housed movably in the bore, the valve normally closing the inner port, a piston slidable in the cylinder adjacent to the inlet and having a stem slidable in the guide, spring means interposed between the guide and the piston for moving the piston in one direction, toward the inlet end of the cylinder, and means for checking the movement of the piston, in said one direction, under the action of the spring means, in such position that the piston is between the outer and intermediate ports, the piston being movable in an opposite direction, into engagement with the guide and valve seat, to close the opening in the guide and valve seat.

FRED M. BENTZ.